US008967865B2

(12) United States Patent
Kimura et al.

(10) Patent No.: US 8,967,865 B2
(45) Date of Patent: *Mar. 3, 2015

(54) BEARING APPARATUS, SPINDLE MOTOR, AND DISK DRIVE APPARATUS (71) Applicant: Nidec Corporation, Kyoto (JP)

(72) Inventors: Akihiro Kimura, Kyoto (JP); Teiichi Hirono, Kyoto (JP); Kunio Sakurada, Kyoto (JP); Kyoko Horise, Kyoto (JP)

(73) Assignee: Nidec Corporation, Kyoto (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/024,868

(22) Filed: Sep. 12, 2013

(65) Prior Publication Data

US 2014/0010065 A1 Jan. 9, 2014

Related U.S. Application Data (63) Continuation of application No. 13/602,420, filed on Sep. 4, 2012, now Pat. No. 8,568,033, which is a continuation of application No. 12/791,147, filed on Jun. 1, 2010, now Pat. No. 8,277,125.

(30) Foreign Application Priority Data

Jun. 12, 2009 (JP) ................................ 2009-141192

(51) Int. Cl.
F16C 32/06 (2006.01)
F16C 17/10 (2006.01)
(Continued)

(52) U.S. Cl.
CPC ............ F16C 32/0659 (2013.01); F16C 17/10 (2013.01); F16C 33/107 (2013.01);
(Continued)

(58) Field of Classification Search
USPC ............... 384/100, 107, 119, 130; 360/99.08, 360/98.07; 310/90
See application file for complete search history.

(56) References Cited

U.S. PATENT DOCUMENTS 5,403,098 A 4/1995 Yasui et al.
5,533,811 A 7/1996 Polch et al.
(Continued)

FOREIGN PATENT DOCUMENTS

DE 10 2011 014 369 A1 9/2012
JP 6-28335 U 4/1994
(Continued)

OTHER PUBLICATIONS

Kimura et al., "Dynamic Pressure Bearing and Spindle Motor Using the Same", U.S. Appl. No. 12/952,223, filed Nov. 23, 2010.
(Continued)

Primary Examiner — Thomas R. Hannon
(74) Attorney, Agent, or Firm — Keating & Bennett, LLP (57) ABSTRACT A bearing apparatus includes a first cup portion defining a portion of a stationary portion of a bearing apparatus includes a first circular plate portion and a first cylindrical portion projecting downward from an outer edge portion of the first circular plate portion. A rotating portion of the bearing apparatus includes an annular recessed portion arranged to accommodate at least a lower end portion of the first cylindrical portion. The stationary portion includes a second cup portion including a second circular plate portion arranged to extend radially outward from an outer circumferential surface of a stationary shaft below the first cup portion and a second cylindrical portion arranged to project upward from an outer edge portion of the second circular plate portion. One of the first and second cup portions is integral with the stationary shaft defining a single monolithic member, and the other is fixed to the stationary shaft.

14 Claims, 10 Drawing Sheets (51) Int. Cl.
  *F16C 33/10* (2006.01)
  *F16C 33/74* (2006.01)
  *G11B 19/20* (2006.01)
  *H02K 5/167* (2006.01)
  *H02K 7/08* (2006.01)

(52) U.S. Cl.
  CPC .......... *F16C33/745* (2013.01); *G11B 19/2036* (2013.01); *H02K 5/1675* (2013.01); *G11B 19/2009* (2013.01); *H02K 7/085* (2013.01); *F16C 2370/12* (2013.01); *H02K 7/08* (2013.01)
  USPC ......................................... 384/100; 384/119

(56) References Cited

U.S. PATENT DOCUMENTS

| | | | |
|---|---|---|---|
| 5,558,443 | A | 9/1996 | Zang |
| 5,880,545 | A | 3/1999 | Takemura et al. |
| 6,211,592 | B1 | 4/2001 | Ichiyama |
| 6,246,136 | B1 | 6/2001 | Ichiyama |
| 6,991,376 | B2 * | 1/2006 | Aiello et al. ............... 384/107 |
| 8,277,125 | B2 * | 10/2012 | Kimura et al. ............... 384/100 |
| 8,567,067 | B2 | 10/2013 | Yamaguchi et al. |
| 8,568,033 | B2 * | 10/2013 | Kimura et al. ............... 384/100 |
| 8,587,895 | B1 | 11/2013 | Sumiji et al. |
| 8,630,063 | B2 | 1/2014 | Sumiji et al. |
| 2004/0090702 | A1 | 5/2004 | Aiello et al. |
| 2004/0096131 | A1 | 5/2004 | Aiello et al. |
| 2004/0156568 | A1 | 8/2004 | Woldemar et al. |
| 2004/0165797 | A1 | 8/2004 | Oku et al. |
| 2004/0175062 | A1 | 9/2004 | Nishimura et al. |
| 2005/0031237 | A1 | 2/2005 | Gomyo et al. |
| 2005/0111769 | A1 | 5/2005 | Haga |
| 2005/0225187 | A1 | 10/2005 | Hafen et al. |
| 2006/0002638 | A1 | 1/2006 | Ichiyama |
| 2006/0002641 | A1 | 1/2006 | Ichiyama |
| 2006/0039634 | A1 | 2/2006 | Ichiyama |
| 2006/0039636 | A1 | 2/2006 | Ichiyama |
| 2006/0051001 | A1 | 3/2006 | Nishimura et al. |
| 2006/0182374 | A1 | 8/2006 | Schwamberger et al. |
| 2006/0210205 | A1 | 9/2006 | Engesser et al. |
| 2006/0222276 | A1 | 10/2006 | Uenosono |
| 2007/0030591 | A1 | 2/2007 | Engesser et al. |
| 2007/0133911 | A1 | 6/2007 | Nishimoto et al. |
| 2007/0140606 | A1 | 6/2007 | Feng et al. |
| 2007/0154123 | A1 | 7/2007 | Gomyo et al. |
| 2007/0177832 | A1 | 8/2007 | Gotoh et al. |
| 2007/0211971 | A1 | 9/2007 | Obara et al. |
| 2008/0056104 | A1 | 3/2008 | Nishimura et al. |
| 2008/0063332 | A1 | 3/2008 | Yamamoto et al. |
| 2008/0187257 | A1 | 8/2008 | Engesser et al. |
| 2008/0292228 | A1 | 11/2008 | Yamashita et al. |
| 2009/0129710 | A1 | 5/2009 | Ito et al. |
| 2009/0140587 | A1 * | 6/2009 | Popov et al. ............... 310/90 |
| 2009/0140588 | A1 | 6/2009 | Drautz et al. |
| 2009/0279818 | A1 * | 11/2009 | Le et al. ............... 384/112 |
| 2010/0033870 | A1 | 2/2010 | Sekii et al. |
| 2010/0127387 | A1 | 5/2010 | Soda et al. |
| 2010/0142869 | A1 | 6/2010 | Grantz et al. |
| 2010/0266225 | A1 | 10/2010 | Yamashita et al. |
| 2010/0296190 | A1 | 11/2010 | Yamada et al. |
| 2010/0321823 | A1 | 12/2010 | Oe et al. |
| 2011/0019303 | A1 | 1/2011 | Yamada et al. |
| 2011/0123139 | A1 | 5/2011 | Kimura et al. |
| 2011/0192210 | A1 | 8/2011 | Yamashita et al. |
| 2012/0033325 | A1 | 2/2012 | Mizukami et al. |
| 2012/0033326 | A1 | 2/2012 | Mizukami et al. |
| 2012/0033327 | A1 | 2/2012 | Mizukami et al. |
| 2012/0033328 | A1 | 2/2012 | Mizukami et al. |
| 2012/0033329 | A1 | 2/2012 | Mizukami et al. |
| 2012/0033330 | A1 | 2/2012 | Mizukami et al. |
| 2012/0063030 | A1 | 3/2012 | Yamada et al. |
| 2012/0243397 | A1 | 9/2012 | Yamamoto et al. |
| 2012/0326543 | A1 | 12/2012 | Kimura et al. |
| 2013/0077190 | A1 | 3/2013 | Kimura et al. |
| 2013/0083426 | A1 | 4/2013 | Tamaoka et al. |
| 2013/0083427 | A1 | 4/2013 | Iwasaki et al. |
| 2013/0120868 | A1 | 5/2013 | Mizukami et al. |
| 2013/0128379 | A1 | 5/2013 | Mizukami et al. |
| 2013/0194701 | A1 | 8/2013 | Fukushima |
| 2013/0242429 | A1 | 9/2013 | Iwasaki et al. |
| 2014/0016229 | A1 | 1/2014 | Sekii et al. |
| 2014/0078617 | A1 | 3/2014 | Sekii et al. |
| 2014/0078879 | A1 | 3/2014 | Sekii et al. |

FOREIGN PATENT DOCUMENTS

| | | |
|---|---|---|
| JP | 6-121484 A | 4/1994 |
| JP | 7-336924 A | 12/1995 |
| JP | 2002-5171 A | 1/2002 |
| JP | 2003-56555 A | 2/2003 |
| JP | 2003-61295 A | 2/2003 |
| JP | 2003-92867 A | 3/2003 |
| JP | 2003-244886 A | 8/2003 |
| JP | 2004-173377 A | 6/2004 |
| JP | 2005-48890 A | 2/2005 |
| JP | 2006-105390 A | 4/2006 |
| JP | 2006-226388 A | 8/2006 |
| JP | 2007-162759 A | 6/2007 |
| JP | 2007-225062 A | 9/2007 |
| JP | 2008-051133 A | 3/2008 |
| JP | 2009-41671 A | 2/2009 |
| JP | 2009-133361 A | 6/2009 |
| JP | 2009-136143 A | 6/2009 |
| JP | 2010-121775 A | 6/2010 |
| JP | 2010-144858 A | 7/2010 |
| JP | 2011-2024 A | 1/2011 |
| JP | 2012-257428 A | 12/2012 |
| WO | 2006/120719 A1 | 11/2006 |

OTHER PUBLICATIONS

Kimura et al., "Bearing Apparatus, Spindle Motor, and Disk Drive Apparatus", U.S. Appl. No. 12/791,147, filed Jun. 1, 2010.
Oe et al., "Bearing Apparatus, Spindle Motor, and Disk Drive Apparatus", U.S. Appl. No. 12/793,851, filed Jun. 4, 2010.
Yamada et al., "Fluid Dynamic Bearing Apparatus, Spindle Motor, and Disk Drive Apparatus", U.S. Appl. No. 12/742,931, filed May 14, 2010.
Yamada et al., "Fluid Dynamic Bearing Apparatus, Spindle Motor, and Disk Drive Apparatus", U.S. Appl. No. 12/899,658, filed Oct. 7, 2010.
Yamada et al., "Fluid Dynamic Bearing Apparatus, Spindle Motor, and Disk Drive Apparatus", U.S. Appl. No. 13/299,542, filed Nov. 18, 2011.
Fukushima, "Motor and Disk Drive Apparatus," U.S. Appl. No. 13/751,380, filed Jan. 28, 2013.
Kimura et al., "Bearing Apparatus, Spindle Motor, and Disk Drive Apparatus", U.S. Appl. No. 13/681,500, filed Nov. 20, 2012.
Kimura et al., "Bearing Apparatus, Spindle Motor, and Disk Drive Apparatus", U.S. Appl. No. 13/602,348, filed Sep. 4, 2012.
Iwasaki et al., "Motor and Disk Drive Apparatus", U.S. Appl. No. 13/613,109, filed Sep. 13, 2012.
Tamaoka et al., "Motor and Disk Drive Apparatus", U.S. Appl. No. 13/613,106, filed Sep. 13, 2012.
Iwasaki et al., "Motor and Disk Drive Apparatus", U.S. Appl. No. 13/613,108, filed Sep. 13, 2012.
Sekii et al., "Spindle Motor and Disk Drive Apparatus", U.S. Appl. No. 13/767,205, filed Feb. 14, 2013.
Sekii et al., "Bearing Apparatus, Spindle Motor, and Disk Drive Apparatus", U.S. Appl. No. 13/789,796, filed Mar. 8, 2013.
Sekii et al., "Bearing Apparatus, Spindle Motor, and Disk Drive Apparatus", U.S. Appl. No. 13/790,089, filed Mar. 8, 2013.
Sato et al., "Spindle Motor and Disk Drive Apparatus", U.S. Appl. No. 13/798,857, filed Mar. 13, 2013.
Sekii, "Motor and Disk Drive Apparatus", U.S. Appl. No. 13/886,290, filed May 3, 2013.
Watanabe et al., "Spindle Motor and Disk Drive Apparatus", U.S. Appl. No. 13/898,921, filed May 21, 2013.

(56) References Cited

OTHER PUBLICATIONS

Kimura et al., "Bearing Mechanism, Motor, and Disk Drive Apparatus", U.S. Appl. No. 13/775,475, filed Feb. 25, 2013.
Sumiji et al., "Bearing Mechanism, Motor, and Disk Drive Apparatus", U.S. Appl. No. 13/775,467, filed Feb. 25, 2013.
Sumiji et al., "Bearing Mechanism, Motor, and Disk Drive Apparatus", U.S. Appl. No. 13/785,297, filed Mar. 5, 2013.
Kimura et al., "Bearing Apparatus, Spindle Motor, and Disk Drive Apparatus", U.S. Appl. No. 13/602,420, filed Sep. 4, 2012.
Ando, et al., "Spindle Motor, and Disk Drive Apparatus", U.S. Appl. No. 14/330,207, filed Jul. 14, 2014.

\* cited by examiner

BEARING APPARATUS, SPINDLE MOTOR, AND DISK DRIVE APPARATUS

BACKGROUND OF THE INVENTION

1. Field of the Invention

The present invention relates to a bearing apparatus, a spindle motor, and a disk drive apparatus.

2. Description of the Related Art

Hard disk apparatuses and optical disk apparatuses are typically provided with a spindle motor arranged to rotate a disk or disks about a center axis thereof. The spindle motor includes a stationary portion fixed to a housing of the disk drive apparatus, and a rotating portion arranged to rotate while supporting the disk(s). The spindle motor is arranged to produce a torque centered on the center axis by magnetic flux generated between the stationary and rotating portions, whereby the rotating portion is caused to rotate with respect to the stationary portion.

The stationary and rotating portions of the spindle motor are joined to each other through a bearing apparatus. In recent years, in particular, spindle motors have often been provided with a bearing apparatus in which a lubricating fluid is arranged between the stationary and rotating portions. JP-A 2002-5171, for example, describes an example of such a bearing apparatus using the lubricating fluid. In the bearing apparatus described in JP-A 2002-5171, the lubricating fluid is arranged to fill a gap between a shaft and a sleeve which are rotatably supported with respect to each other.

The bearing apparatus described in JP-A 2002-5171 includes a radial dynamic pressure bearing portion and a pumping action portion. The bearing apparatus having such a structure has a problem in that, when it is desirable to limit the axial dimension of the bearing apparatus, both the axial dimension of the radial dynamic pressure bearing portion and that of the pumping action portion is not sufficient enough to allow both the radial dynamic pressure bearing portion and the pumping action portion to both exhibit a sufficient performance.

In addition, the pumping action portion may sometimes introduce air bubbles into the lubricating fluid when pumping the lubricating fluid. If the air bubbles introduced into the lubricating fluid are accumulated in the vicinity of a thrust dynamic pressure bearing portion or the radial dynamic pressure bearing portion, generation of a dynamic pressure in the lubricating fluid may be hindered. If this happens, a sufficient supporting force may not be obtained between the shaft and the sleeve to allow the bearing apparatus to maintain a sufficient rotation performance.

SUMMARY OF THE INVENTION

According to a preferred embodiment of the present invention, a bearing apparatus includes a stationary portion preferably including a stationary shaft arranged along a center axis extending in a vertical direction, and a first cup portion preferably including a first circular plate portion extending radially outward from the stationary shaft; a rotating portion arranged to rotate about the stationary shaft; and a lubricating oil. The first cup portion further preferably includes a first cylindrical portion projecting downward from an outer edge portion of the first circular plate portion. The rotating portion preferably includes a first upper surface arranged opposite to a lower surface of the first circular plate portion; an annular recessed portion arranged to accommodate at least a lower end portion of the first cylindrical portion; a first inner circumferential surface arranged opposite to an outer circumferential surface of the stationary shaft; and a second inner circumferential surface arranged opposite to an outer circumferential surface of the first cup portion. The lubricating oil is arranged in a gap between the stationary and rotating portions. At least one of the outer circumferential surface of the stationary shaft and the first inner circumferential surface of the rotating portion includes a radial dynamic pressure groove array.

The stationary portion includes a second cup portion including a second circular plate portion and a second cylindrical portion. The second circular plate portion is arranged to extend radially outward from the outer circumferential surface of the stationary shaft below the first cup portion. The second cylindrical portion is arranged to project upward from an outer edge portion of the second circular plate portion.

At least one of a lower surface of the rotating portion and an upper surface of the second cup portion includes a lower thrust dynamic pressure groove array arranged to generate a fluid dynamic pressure in the lubricating oil during rotation of the rotating portion.

A lower surface of the lubricating oil is located between the second cup portion and rotating portions at a level lower than a level of the annular recessed portion.

One of the first and second cup portions preferably is defined integrally with the stationary shaft as a single monolithic member, while the other of the first and second cup portions preferably is fixed to the stationary shaft.

According to this preferred embodiment of the present invention, it is possible to limit the axial dimension of the bearing apparatus as a whole while also enabling the radial dynamic pressure groove array.

The above and other features, elements, arrangements, steps, characteristics and advantages of the present invention will become more apparent from the following detailed description of preferred embodiments of the present invention with reference to the attached drawings.

DETAILED DESCRIPTION OF THE PREFERRED EMBODIMENTS

Hereinafter, preferred embodiments of the present invention will be described with reference to the accompanying drawings. It is assumed herein that an upward/downward direction (i.e., a vertical direction) is defined along a center axis 9, with a direction in which a cylindrical portion 133b of a first cup portion 133 projects defined as a downward direction. The shape of each member and relative positions of different members will be described based on this assumption. It should be noted, however, that the above definition of the upward/downward direction is simply applied to facilitate the description provided herein, and should not be construed to restrict in any way the orientation of a bearing apparatus, a spindle motor, or a disk drive apparatus according to any preferred embodiment of the present invention when actually installed in a device.

Figure 1:
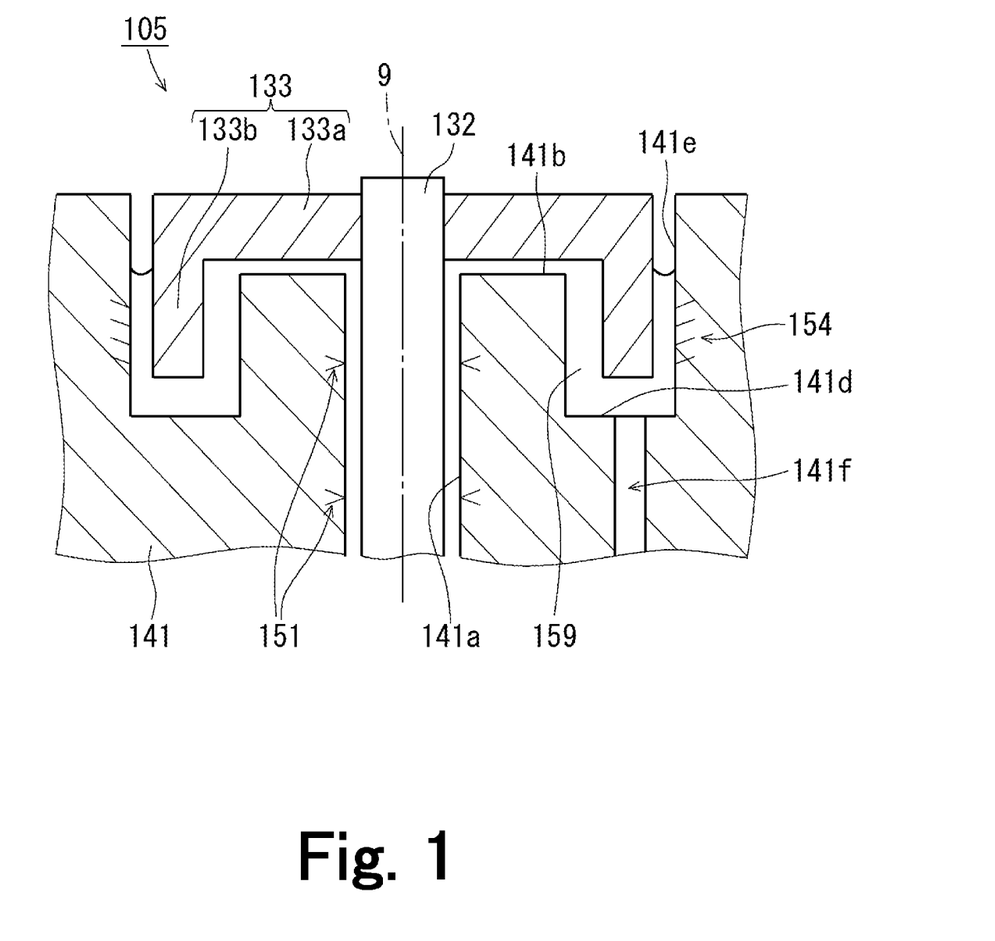
FIG. 1 is a diagram illustrating the structure of a bearing apparatus according to a preferred embodiment of the present invention.

FIG. 1 is a diagram illustrating the structure of a bearing apparatus 105 according to a preferred embodiment of the present invention. Referring to FIG. 1, the bearing apparatus 105 preferably includes a rotating portion 141 and a stationary portion including a stationary shaft 132 and the first cup portion 133. The stationary shaft 132 is arranged along the center axis 9 extending in the vertical direction. The first cup portion 133 includes a circular plate portion 133a and the cylindrical portion 133b. The circular plate portion 133a extends radially outward from the stationary shaft 132. The cylindrical portion 133b projects downward from an outer edge portion of the circular plate portion 133a.

The rotating portion 141 is supported around the stationary shaft 132 so as to be rotatable about the center axis 9. As illustrated in FIG. 1, the rotating portion 141 preferably includes a first inner circumferential surface 141a, a first upper surface 141b, an annular recessed portion 141d, and a second inner circumferential surface 141e. The first inner circumferential surface 141a is arranged opposite to an outer circumferential surface of the stationary shaft 132. The first upper surface 141b is arranged opposite to a lower surface of the circular plate portion 133a of the first cup portion 133. The annular recessed portion 141d is arranged to accommodate at least a lower end portion of the cylindrical portion 133b of the first cup portion 133. The second inner circumferential surface 141e is arranged opposite to an outer circumferential surface of the first cup portion 133.

A lubricating oil 159 is arranged in a gap between the stationary portion and the rotating portion 141. An upper surface of the lubricating oil 159 is located between the outer circumferential surface of the first cup portion 133 and the second inner circumferential surface 141e of the rotating portion 141, whereas a lower surface of the lubricating oil 159 is located between the stationary portion and the rotating portion 141 at a level lower than that of the annular recessed portion 141d.

The rotating portion 141 includes a through hole 141f. One end of the through hole 141f opens into the annular recessed portion 141d, while an opposite end of the through hole 141f opens into the gap between the rotating portion 141 and the stationary portion at a level lower than that of the annular recessed portion 141d. The through hole 141f is filled with the lubricating oil 159.

At least one of the outer circumferential surface of the stationary shaft 132 and the first inner circumferential surface 141a of the rotating portion 141 has a radial dynamic pressure groove array 151 arranged thereon. During rotation of the rotating portion 141, the radial dynamic pressure groove array 151 serves to cause the lubricating oil 159 to flow upward in a gap between the outer circumferential surface of the stationary shaft 132 and the first inner circumferential surface 141a of the rotating portion 141.

At least one of the outer circumferential surface of the first cup portion 133 and the second inner circumferential surface 141e of the rotating portion 141 has a pumping groove array 154 arranged thereon. During the rotation of the rotating portion 141, the pumping groove array 154 serves to cause the lubricating oil 159 to flow toward the lower end portion of the cylindrical portion 133b.

In the present preferred embodiment, the first cup portion 133 includes the cylindrical portion 133b projecting downward while at the same time the rotating portion 141 includes the annular recessed portion 141d arranged to accommodate at least the lower end portion of the cylindrical portion 133b. This arrangement makes it possible to limit the axial dimension of the bearing apparatus 105 as a whole while maintaining a sufficient axial dimension of both the radial dynamic pressure groove array 151 and the pumping groove array 154. Moreover, in the present preferred embodiment, one end of the through hole 141f opens into the annular recessed portion 141d. Accordingly, any air bubbles that have been introduced by the pumping groove array 154 into the lubricating oil 159 will be efficiently sent into the through hole 141f, so that the air bubbles may be discharged out of the bearing apparatus 105 through the lower surface of the lubricating oil 159.

Next, a preferred embodiment of the present invention will be described below in a greater detail.

Figure 2:
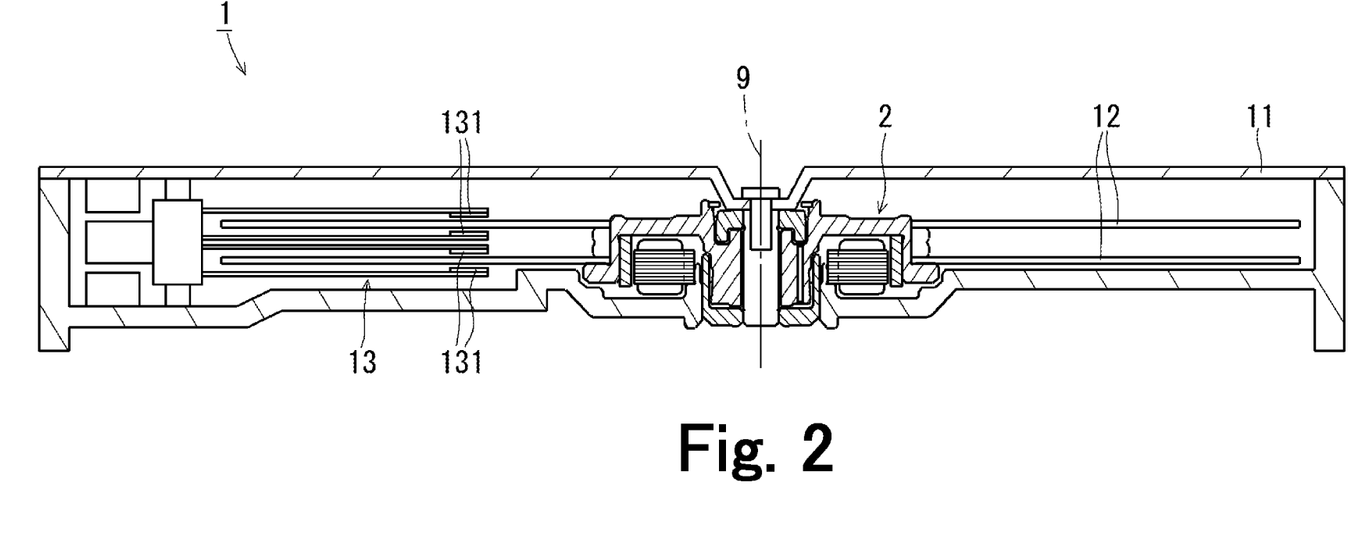
FIG. 2 is a vertical cross-sectional view of a disk drive apparatus according to a preferred embodiment of the present invention.

FIG. 2 is a vertical cross-sectional view of a disk drive apparatus 1 according to a preferred embodiment of the present invention. The disk drive apparatus 1 is a device designed to read and write information from or to magnetic disks (hereinafter referred to simply as "disks" 12) while rotating the disks 12. As illustrated in FIG. 2, the disk drive apparatus 1 preferably includes an apparatus housing 11, two disks 12, an access portion 13, and a spindle motor 2.

The apparatus housing 11 preferably includes the two disks 12, the access portion 13, and the spindle motor 2. The access portion 13 includes heads 131, and is arranged to move any of the heads 131 along a recording surface of an associated one of the disks 12 supported by the spindle motor 2 to read or write information from or to the disk 12. Note that the access portion 13 may be only capable of either reading or writing information from or to any disk 12.

Figure 3:
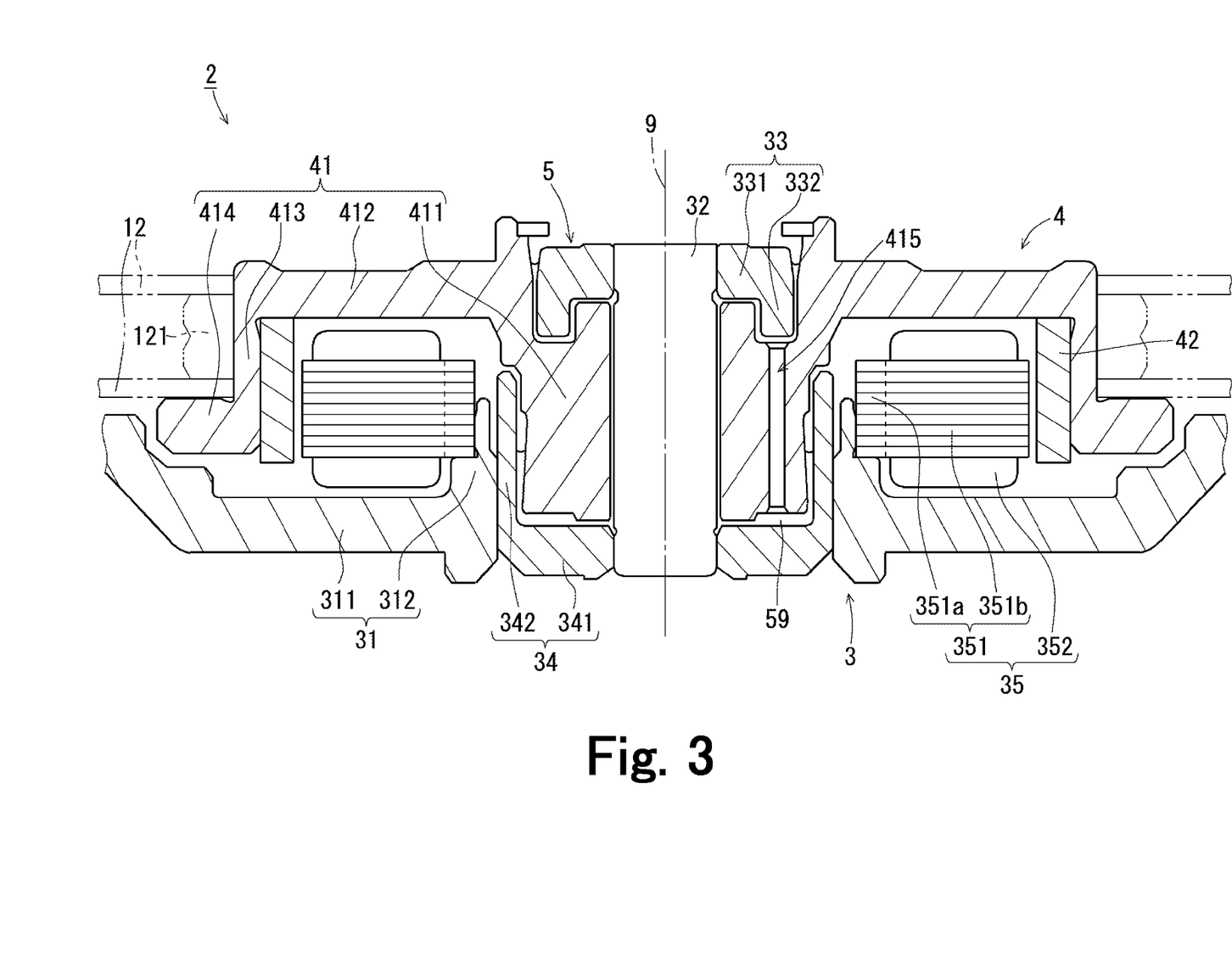
FIG. 3 is a vertical cross-sectional view of a spindle motor according to a preferred embodiment of the present invention.

Next, the structure of the spindle motor 2 will now be described below. FIG. 3 is a vertical cross-sectional view of the spindle motor 2. As illustrated in FIG. 3, the spindle motor 2 includes a stationary portion 3 fixed to the apparatus housing of the disk drive apparatus 1, and a rotating portion 4 arranged to rotate about the center axis 9 while supporting the disks 12.

The stationary portion 3 preferably includes a base member 31, a stationary shaft 32, a first cup portion 33, a second cup portion 34, and a stator unit 35. An upper end portion of the stationary shaft 32 is fixed to a cover member of the apparatus housing 11 (see FIG. 2). On the other hand, a lower end portion of the stationary shaft 32 is fixed in relation to the base member 31 through the second cup portion 34.

The base member 31 defines a portion of the apparatus housing 11 of the disk drive apparatus 1 (see FIG. 2), and is integral with a remaining portion of the apparatus housing 11. Note, however, that in other preferred embodiments the base member 31 and the apparatus housing 11 may be defined by separate members fixed to each other. The base member 31 includes a plate portion 311 extending radially, and a holder portion 312 substantially in the shape of a cylinder and projecting upward from an inner edge portion of the plate portion 311. The base member 31 is made, for example, of a metal such as an aluminum alloy or the like.

Figure 9:
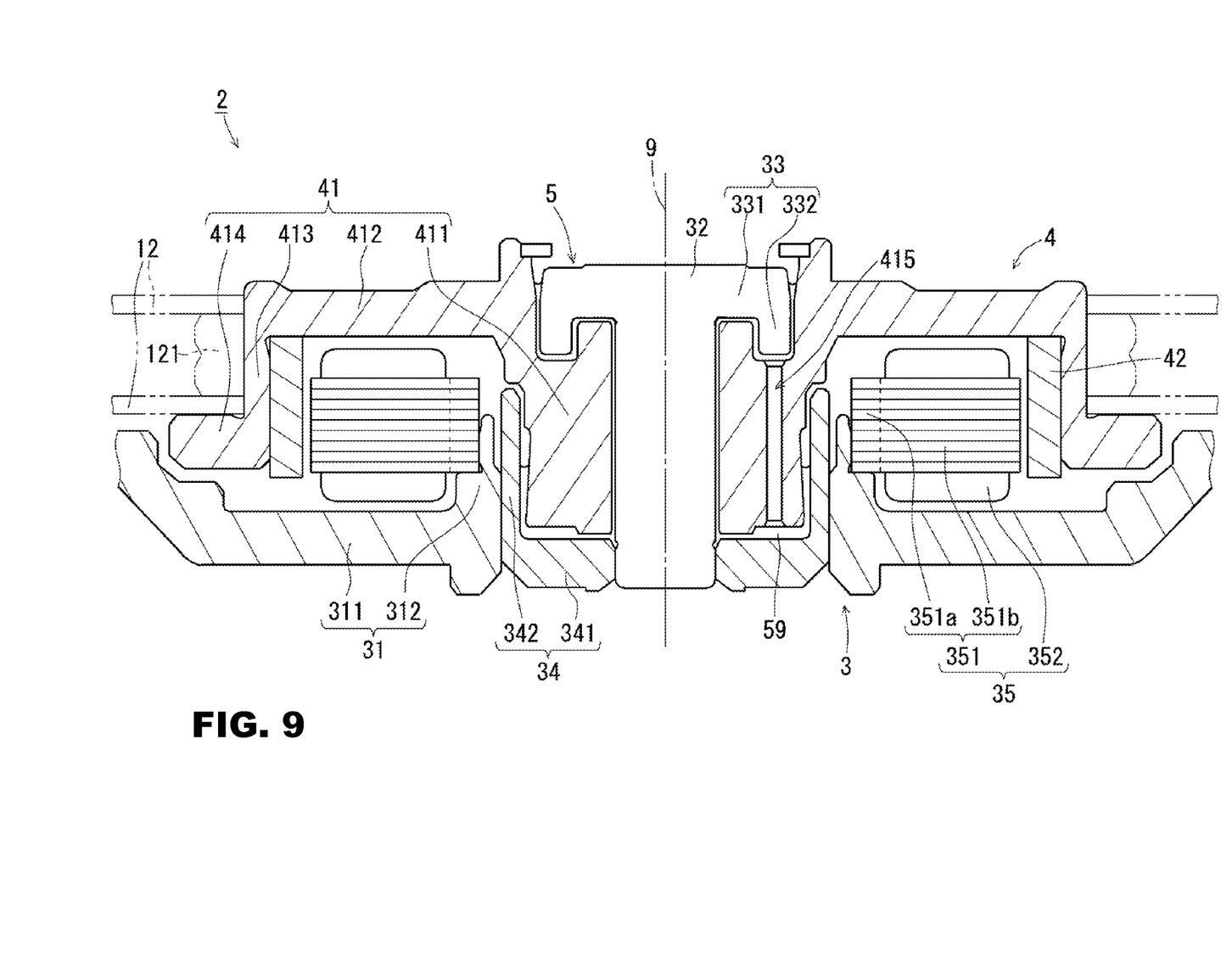
FIG. 9 is a vertical cross-sectional view of a spindle motor according to another preferred embodiment of the present invention.
Figure 10:
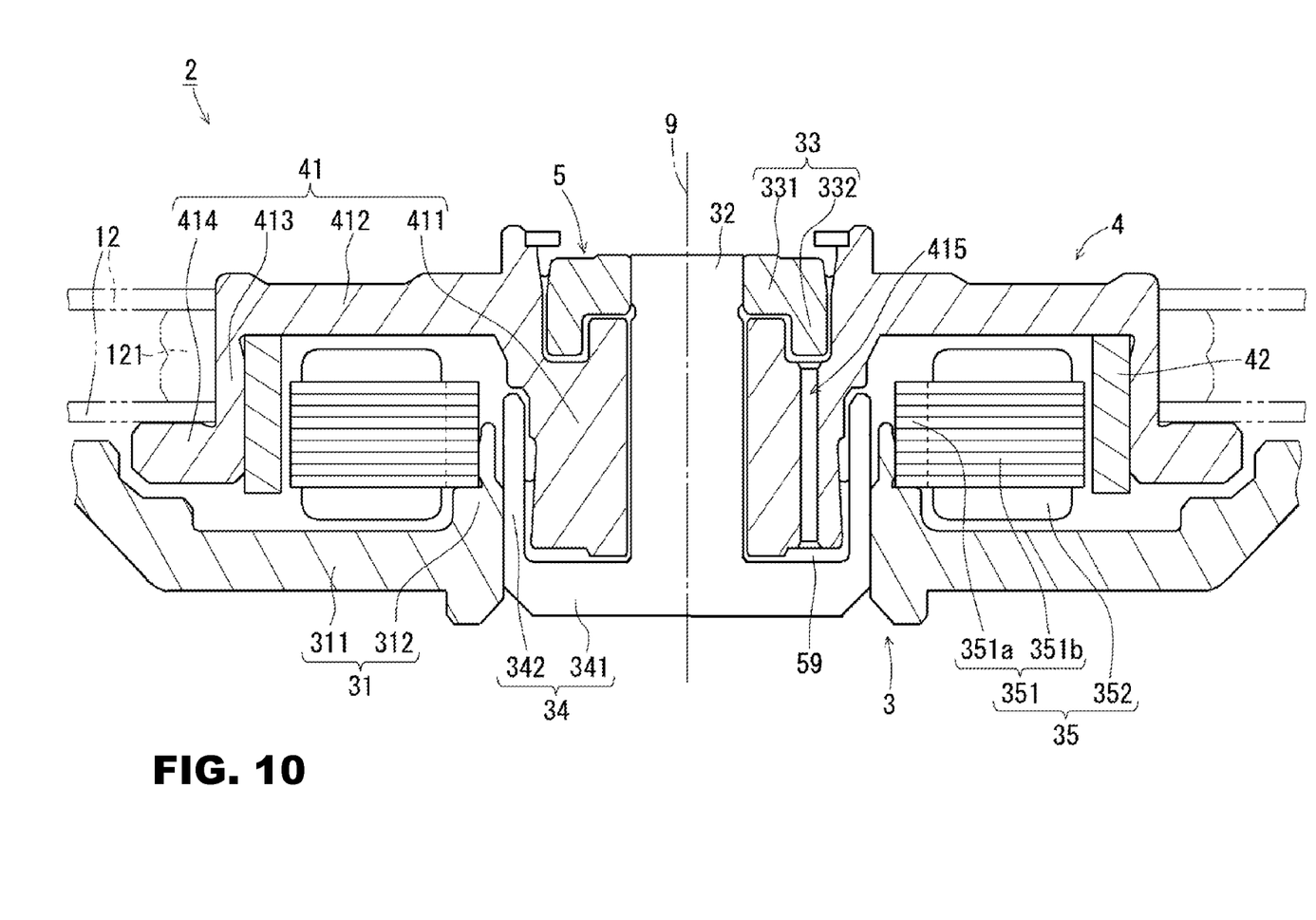
FIG. 10 is a vertical cross-sectional view of a spindle motor according to yet another preferred embodiment of the present invention.

The stationary shaft 32 is preferably a substantially columnar member arranged along the center axis 9. The first cup portion 33 is fixed to the stationary shaft 32 in the vicinity of an upper end thereof, while the second cup portion 34 is fixed to the stationary shaft 32 in the vicinity of a lower end thereof. The stationary shaft 32 is made, for example, of a metal such as stainless steel or the like. One of the first cup portion 33 and the second cup portion 34 is preferably integral with the stationary shaft 32 to thereby define a single monolithic member, and the other of the first cup portion 33 and the second cup portion 34 is fixed to the stationary shaft 32, as shown, for example, in FIGS. 9 and 10.

The first cup portion 33 is fixed to an outer circumferential surface of the stationary shaft 32. The first cup portion 33 is preferably press-fitted to the stationary shaft 32 in the vicinity of the upper end thereof, and at the same time fixed to the stationary shaft 32 through an adhesive. However, the first cup portion 33 could also be connected to the stationary shaft 32 in any other desirable manner. The first cup portion 33 includes a circular plate portion 331 and a cylindrical portion 332. The circular plate portion 331 is preferably fixed to the outer circumferential surface of the stationary shaft 32, and extends radially outward from the stationary shaft 32. The cylindrical portion 332 preferably projects downward from an outer edge portion of the circular plate portion 331. A vertical section of the first cup portion substantially assumes the shape of the letter "L" with the circular plate portion 331 and the cylindrical portion 332. The first cup portion 33 is preferably made, for example, of a resin, a metal containing copper as a main component, or the like.

The second cup portion 34 is preferably fixed to the outer circumferential surface of the stationary shaft 32 at a level lower than that of the first cup portion 33. The second cup portion 34 is press-fitted to the stationary shaft 32 in the vicinity of the lower end thereof, and at the same time fixed to the stationary shaft 32 through an adhesive. However, the second cup portion 34 could also be connected to the stationary shaft in any other desirable manner. The second cup portion 34 includes a circular plate portion 341 and a cylindrical portion 342. The circular plate portion 341 is preferably fixed to the outer circumferential surface of the stationary shaft 32, and extends radially outward from the stationary shaft 32. The cylindrical portion 342 preferably projects upward from an outer edge portion of the circular plate portion 341. A vertical section of the second cup portion 34 substantially assumes the shape of the letter "L" with the circular plate portion 341 and the cylindrical portion 342. The second cup portion 34 is made, for example, of a resin, a metal containing copper as a main component, or the like.

The second cup portion 34 is fixed to the base member with an outer circumferential surface of the cylindrical portion 342 in contact with an inner circumferential surface of the holder portion 312 of the base member 31. Accordingly, the stationary shaft 32 is indirectly fixed to the base member 31 through the second cup portion 34. Note that in other preferred embodiments the stationary shaft 32 and one or both of the first and second cup portions 33 and 34 may be defined by a single member.

The stator unit 35 includes a stator core 351 and a plurality of coils 352. The stator unit 35 is arranged to generate magnetic flux in accordance with a drive current applied to the coils 352. The stator core 351 preferably includes a ring-shaped core back 351a and a plurality of tooth portions 351b projecting radially outward from the core back 351a. The core back 351a is fixed to an outer circumferential surface of the holder portion 312 of the base member 31. The stator core 351 is obtained, for example, by subjecting magnetic steel sheets laminated in an axial direction to a stamping process. The coils 352 are defined by a lead wire wound about each tooth portion 351b of the stator core 351.

The rotating portion 4 includes a hub 41 and a rotor magnet 42.

The hub 41 is arranged around the stationary shaft 32 to rotate about the center axis 9. The hub 41 preferably includes a sleeve portion 411, a plate portion 412, an outer cylindrical portion 413, and a flange portion 414. The sleeve portion 411 includes an inner circumferential surface arranged opposite to the outer circumferential surface of the stationary shaft 32. With respect to an axial direction, the sleeve portion 411 is arranged between the circular plate portion 331 of the first cup portion 33 and the circular plate portion 341 of the second cup portion 34. The plate portion 412 extends radially outward from an upper end portion of the sleeve portion 411. A maximum axial thickness of the cylindrical portion 332 of the first cup portion 33 is preferably greater than a minimum axial thickness of all portions of the plate portion 412 directly axially opposed to the stator unit 35. The outer cylindrical portion 413 extends downward from an outer edge portion of the plate portion 412. The flange portion 414 projects radially outward from a lower end portion of the outer cylindrical portion 413.

An outer circumferential surface of the outer cylindrical portion 413 is arranged in contact with an inner circumferential portion of each of the two disks 12. An upper surface of the flange portion 414 has a lower one of the disks 12 mounted thereon. While the lower disk 12 is mounted on the upper surface of the flange portion 414, an upper one of the disks 12 is preferably mounted on a spacer 121 arranged on the lower disk 12. The inner circumferential portion of each disk 12 is arranged in contact with the outer circumferential surface of the outer cylindrical portion 413, so that the radial position of each disk 12 is determined. The outer cylindrical portion 413 and the flange portion 414 together define a support portion arranged to support the two disks 12 in the above-described manner.

The rotor magnet 42 is fixed to an inner circumferential surface of the outer cylindrical portion 413 of the hub 41. The rotor magnet 42 is in the shape of a ring centered on the center axis 9. An inner circumferential surface of the rotor magnet 42 is arranged radially opposite to outer circumferential surfaces of the tooth portions 351b of the stator core 351. The inner circumferential surface of the rotor magnet 42 defines a pole surface where the north and south poles alternate with each other.

A lubricating oil 59 is arranged in minute gaps that are defined between the stationary shaft 32, the first cup portion 33, the second cup portion 34, and the hub 41. An upper surface of the lubricating oil 59 is located between an outer circumferential surface of the first cup portion 33 and an inner circumferential surface of the plate portion 412 of the hub 41. A lower surface of the lubricating oil 59 is located between an inner circumferential surface of the cylindrical portion 342 of the second cup portion 34 and an outer circumferential surface of the sleeve portion 411 of the hub 41.

The sleeve portion 411 of the hub 41 has a through hole 415 extending in the axial direction from an upper surface to a lower surface thereof defined therein. The through hole 415 is filled with the lubricating oil 59. Examples of the lubricating oil 59 include, for example, oils containing an ester as a main component, such as polyolester oil and diester oil.

The hub 41 is supported through the lubricating oil 59 to be rotatable with respect to the stationary shaft 32 and the first and second cup portions 33 and 34. That is, in the present preferred embodiment, the stationary shaft 32, the first and second cup portions 33 and 34, and the hub 41 preferably together define a fluid dynamic bearing apparatus 5 arranged to join the stationary and rotating portions 3 and 4 to each other such that the stationary and rotating portions 3 and 4 are rotatable relative to each other. The stationary shaft 32 and the first and second cup portions 33 and 34 preferably together define a stationary portion of the fluid dynamic bearing apparatus 5. The hub 41 preferably defines a rotating portion of the fluid dynamic bearing apparatus 5.

Regarding the spindle motor 2 described above, when the drive current is applied to the coils 352 of the stationary portion 3, radial magnetic flux is generated about the tooth portions 351b of the stator core 351. Then, the magnetic flux of the tooth portions 351b and that of the rotor magnet 42 interact with each other to produce a circumferential torque, so that the rotating portion 4 is caused to rotate about the center axis 9 with respect to the stationary portion 3. The disks 12 supported by the hub 41 are also caused to rotate about the center axis 9 along with the hub 41.

Next, the structure of those members which are arranged in contact with the lubricating oil 59 will now be described in greater detail below.

Figure 4:
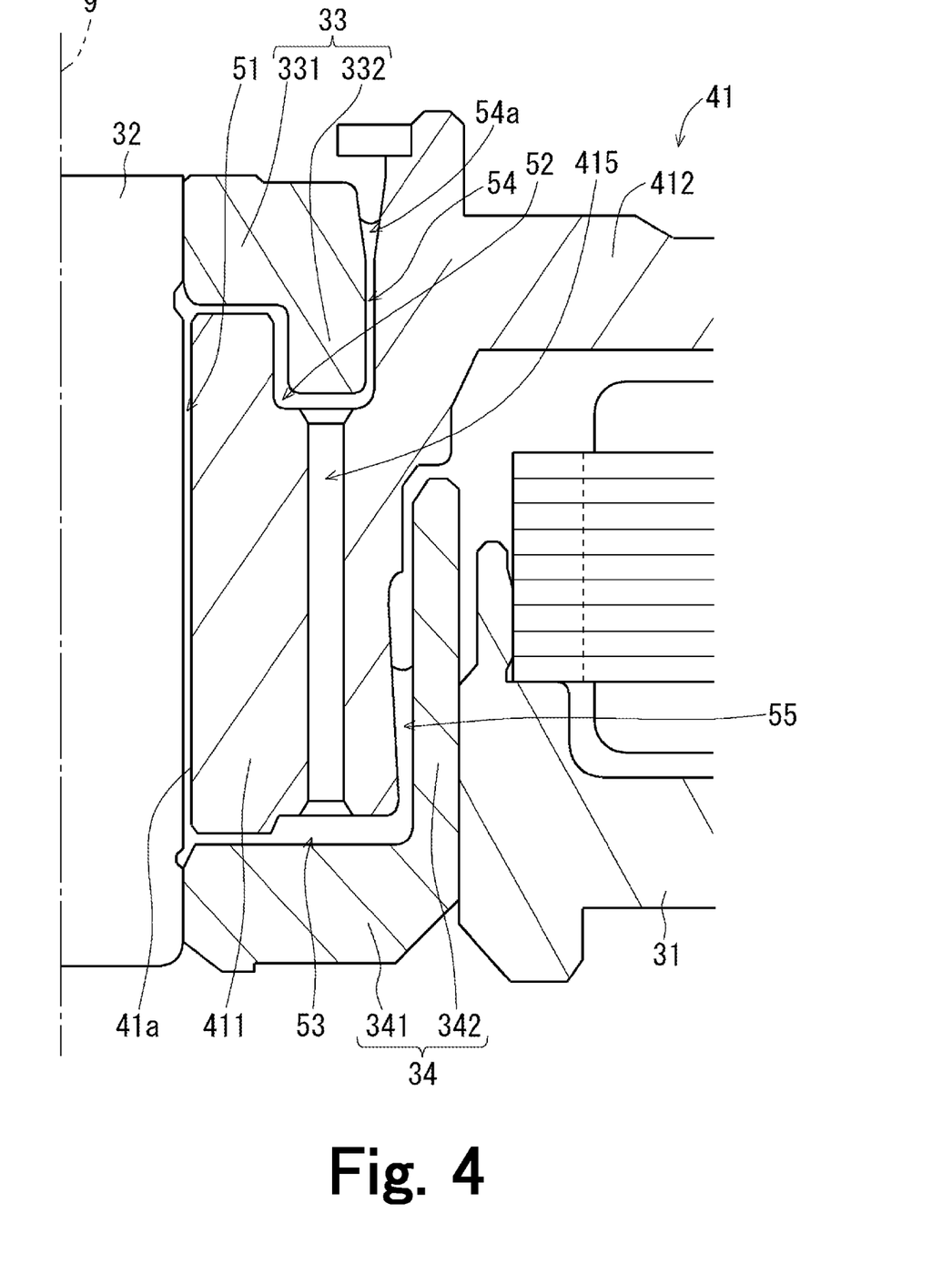
FIG. 4 is a vertical cross-sectional view of a stationary shaft, a first cup portion, a second cup portion, a sleeve portion of a hub, and their vicinity, according to a preferred embodiment of the present invention.

FIG. 4 is a vertical cross-sectional view of the stationary shaft 32, the first and second cup portions 33 and 34, the sleeve portion 411 of the hub 41, and their vicinity. As illustrated in FIG. 4, a gap 51 defined between the outer circumferential surface of the stationary shaft 32 and an inner circumferential surface 41a of the sleeve portion 411, a gap 52 defined between the upper surface of the sleeve portion 411 and a lower surface of the first cup portion 33, a gap 53 defined between the lower surface of the sleeve portion 411 and an upper surface of the circular plate portion 341 of the second cup portion 34, and the through hole 415 define mutually communicating spaces filled with the lubricating oil 59.

Figure 5:
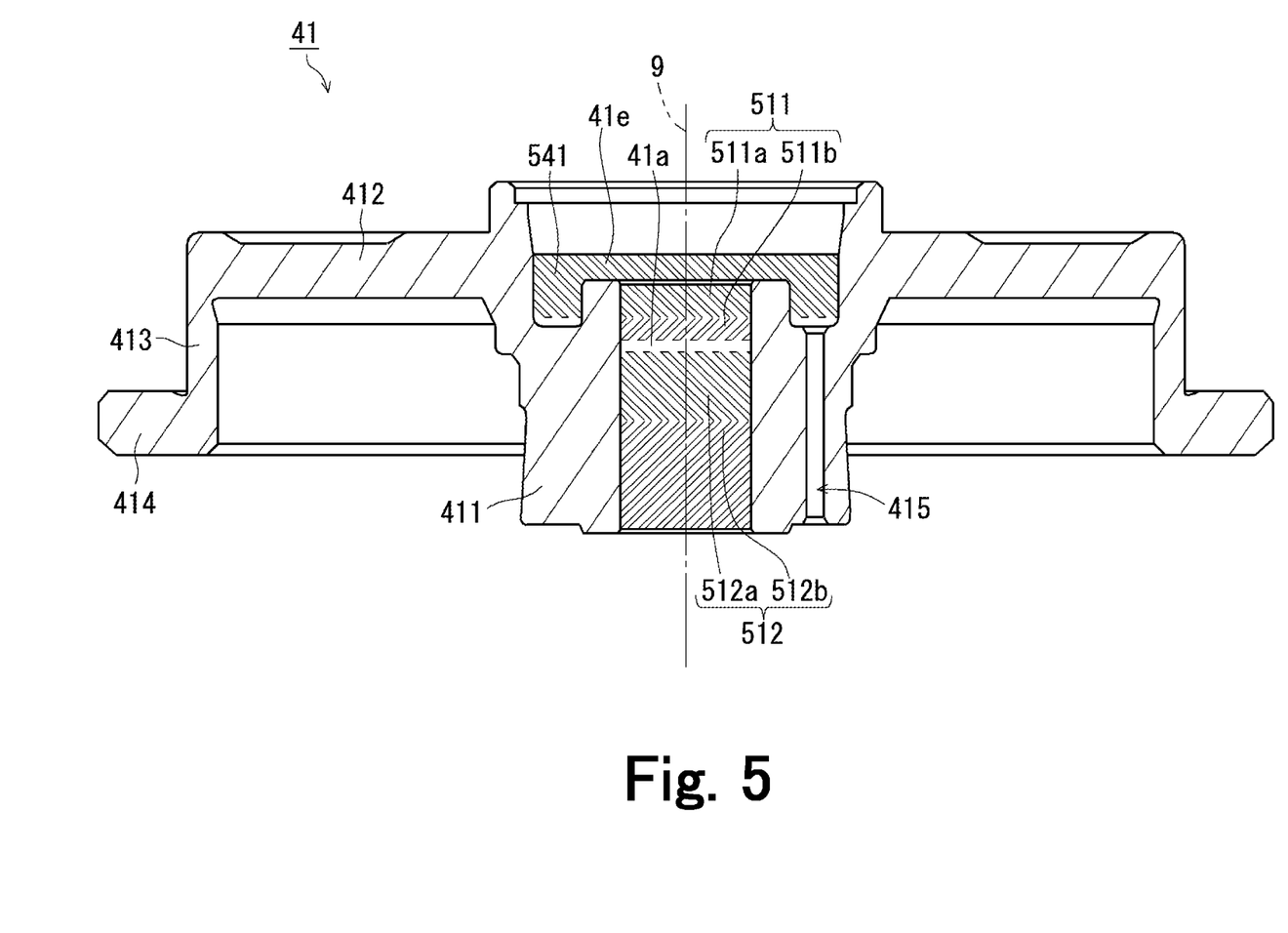
FIG. 5 is a vertical cross-sectional view of the hub.

FIG. 5 is a vertical cross-sectional view of the hub 41. As illustrated in FIG. 5, the inner circumferential surface (hereinafter referred to as a "first inner circumferential surface") 41a of the sleeve portion 411 of the hub 41 has upper and lower radial dynamic pressure groove arrays 511 and 512 arranged thereon to generate a fluid dynamic pressure in the lubricating oil 59 in the gap 51. Each of the upper and lower radial dynamic pressure groove arrays 511 and 512 is an array of a plurality of hook-shaped dynamic pressure generating grooves in a so-called herringbone pattern arranged in a circumferential direction. During the rotation of the hub 41 relative to the stationary shaft 32, a pressure is applied to the lubricating oil 59 in the gap 51 by the upper and lower radial dynamic pressure groove arrays 511 and 512. The hub 41 is arranged to rotate while being radially supported by the fluid dynamic pressure generated in the lubricating oil 59 in the gap 51.

Note that it is enough that the upper and lower radial dynamic pressure groove arrays 511 and 512 are arranged on at least one of the first inner circumferential surface 41a of the hub 41 and the outer circumferential surface of the stationary shaft 32.

As illustrated in FIG. 5, the upper radial dynamic pressure groove array 511 includes a plurality of first parallel grooves 511a arranged to cause a downward flow of the lubricating oil 59, and a plurality of second parallel grooves 511b arranged to cause an upward flow of the lubricating oil 59. Meanwhile, the lower radial dynamic pressure groove array 512 includes a plurality of third parallel grooves 512a arranged to cause a downward flow of the lubricating oil 59, and a plurality of fourth parallel grooves 512b arranged to cause an upward flow of the lubricating oil 59.

In the present preferred embodiment, the sum of the axial dimension of the second parallel grooves 511b and that of the fourth parallel grooves 512b is preferably greater than the sum of the axial dimension of the first parallel grooves 511a and that of the third parallel grooves 512a. Accordingly, an upward flow of the lubricating oil 59 caused by a combination of the second and fourth parallel grooves 511b and 512b is greater than a downward flow of the lubricating oil 59 caused by a combination of the first and third parallel grooves 511a and 512a. Therefore, the upper and lower radial dynamic pressure groove arrays 511 and 512 as a whole serve to cause the lubricating oil 59 to flow upward in the gap 51.

Note that it may be so arranged that the number of second and fourth parallel grooves 511b and 512b is greater than the number of first and third parallel grooves 511a and 512a, and/or that the width and/or depth of the second and fourth parallel grooves 511b and 512b is greater than the width and/or depth of the first and third parallel grooves 511a and 512a, in order to cause the lubricating oil 59 to flow upward in the gap 51.

Figure 6:
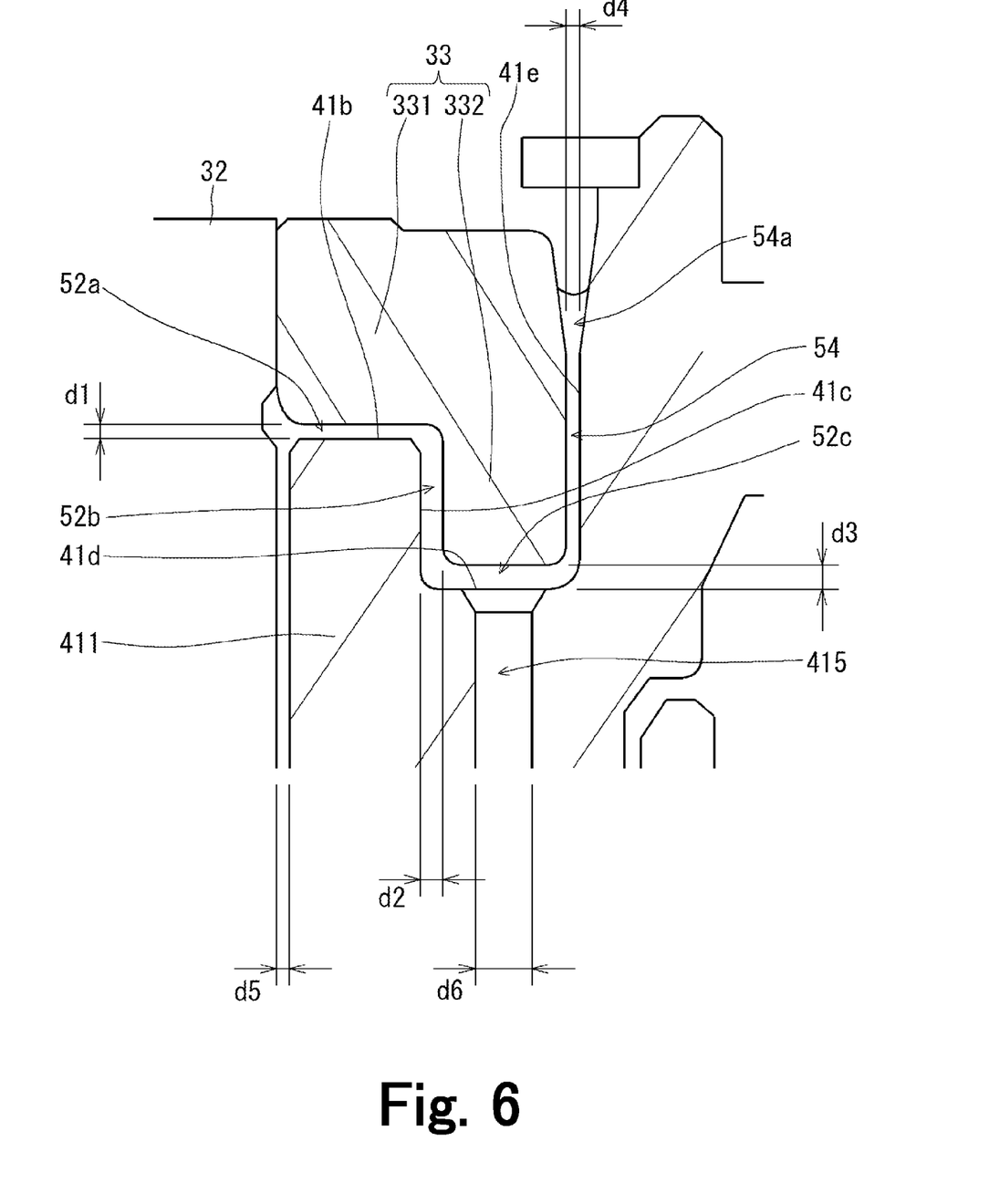
FIG. 6 is an enlarged vertical cross-sectional view of the first cup portion and its vicinity.

FIG. 6 is an enlarged vertical cross-sectional view of the first cup portion 33 and its vicinity. As illustrated in FIG. 6, the upper surface of the sleeve portion 411 of the hub 41 includes a first upper surface 41b, a cylindrical surface 41c, and a second upper surface 41d. The first upper surface 41b spreads radially outward from an upper end portion of the first inner circumferential surface 41a. The cylindrical surface 41c extends downward from an outer edge portion of the first upper surface 41b. The second upper surface 41d spreads radially outward from a lower end portion of the cylindrical surface 41c.

The first upper surface 41b is arranged opposite to a lower surface of the circular plate portion 331 of the first cup portion 33 with a first gap 52a defined therebetween. The cylindrical surface 41c is arranged opposite to an inner circumferential surface of the cylindrical portion 332 of the first cup portion 33 with a second gap 52b defined therebetween. The second upper surface 41d is arranged opposite to a lower surface of the cylindrical portion 332 of the first cup portion with a third gap 52c defined therebetween. The annular recessed portion accommodates a lower end portion of the cylindrical portion 332 of the first cup portion 33.

Figure 7:
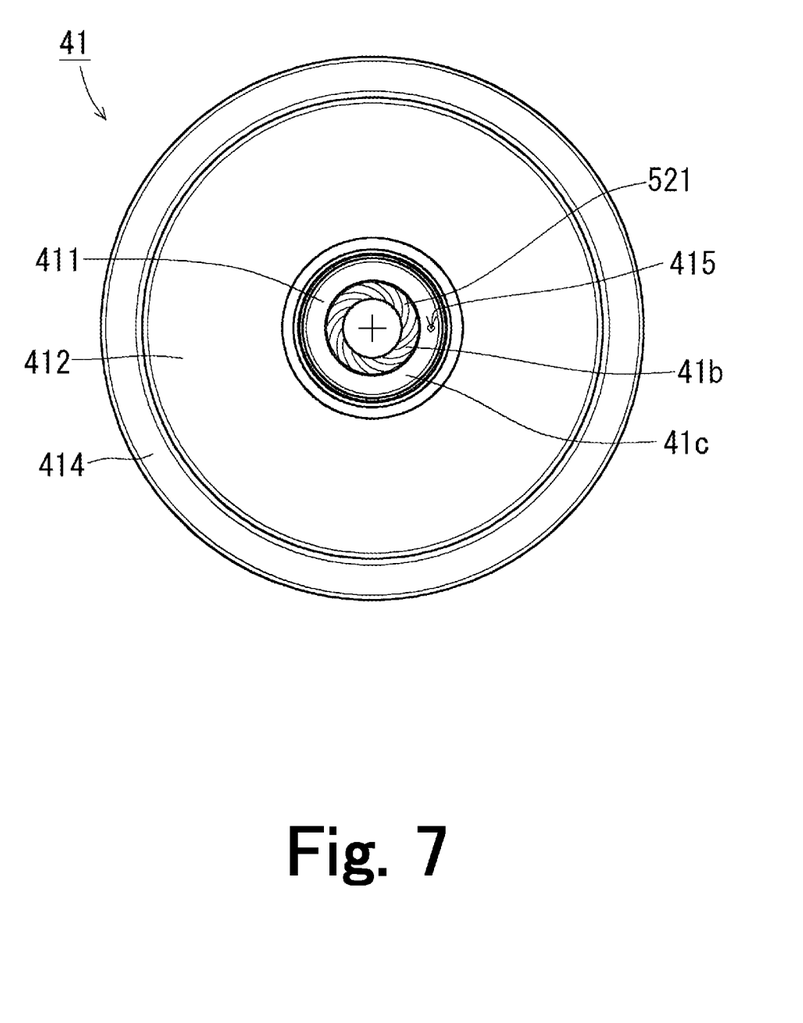
FIG. 7 is a top view of the hub.

FIG. 7 is a top view of the hub 41. As illustrated in FIG. 7, the first upper surface 41b of the hub 41 has an upper thrust dynamic pressure groove array 521 arranged thereon to generate a fluid dynamic pressure in the lubricating oil 59 in the first gap 52a.

The upper thrust dynamic pressure groove array 521 is an array of a plurality of dynamic pressure generating grooves in a spiral pattern centered on the center axis 9 which are arranged in the circumferential direction. During the rotation of the hub 41 relative to the stationary shaft 32, a pressure is applied to the lubricating oil 59 by the upper thrust dynamic pressure groove array 521. The hub 41 is arranged to rotate while being axially supported in relation to the first cup portion 33 by the fluid dynamic pressure generated in the lubricating oil 59.

Note that it is enough that the upper thrust dynamic pressure groove array 521 is arranged on at least one of the first upper surface 41b of the sleeve portion 411 and the lower surface of the circular plate portion 331 of the first cup portion 33.

Returning to FIG. 6, the axial dimension d1 of the first gap 52a is preferably smaller than both the radial dimension d2 of the second gap 52b and the axial dimension d3 of the third gap 52c during the rotation of the hub 41 relative to the stationary shaft 32. For example, the axial dimension d1 of the first gap 52a is preferably about 30 μm or less, and both the radial dimension d2 of the second gap 52b and the axial dimension d3 of the third gap 52c are preferably about 50 μm or greater. This arrangement of the dimensions d1, d2, and d3 enables an excellent generation of the fluid dynamic pressure in the lubricating oil 59 in the first gap 52a while at the same time reducing a loss in torque caused by friction in the second and third gaps 52b and 52c.

An inner circumferential surface (hereinafter referred to as a "second inner circumferential surface") 41e of the plate portion 412 of the hub 41 is arranged opposite to the outer circumferential surface of the first cup portion 33 with a fourth gap 54 defined therebetween. As illustrated in FIG. 5, the second inner circumferential surface 41e of the hub 41 has a pumping groove array 541 arranged thereon to generate a fluid dynamic pressure in the lubricating oil 59 in the fourth gap 54 to cause a downward flow of the lubricating oil 59 therein.

The pumping groove array 541 is preferably an array of a plurality of oblique dynamic pressure generating grooves arranged in the circumferential direction. While the hub 41 rotates with respect to the first cup portion 33, the pumping groove array 541 serves to apply a downward pressure to the lubricating oil 59 in the fourth gap 54, so that the lubricating oil 59 flows toward the lower end portion of the cylindrical portion 332 of the first cup portion 33. Thus, a leakage of the lubricating oil 59 through the fourth gap 54 is prevented.

Note that it is enough that the pumping groove array 541 is arranged on at least one of the second inner circumferential surface 41e of the hub 41 and the outer circumferential surface of the first cup portion 33.

Returning to FIG. 6, the radial dimension d4 of the fourth gap 54 is preferably smaller than both the radial dimension d2 of the second gap 52b and the axial dimension d3 of the third gap 52c during the rotation of the hub 41 relative to the stationary shaft 32. For example, the radial dimension d4 of the fourth gap 54 is preferably in the range of about 10 µm to about 40 µm, and both the radial dimension d2 of the second gap 52b and the axial dimension d3 of the third gap 52c are preferably about 50 µm or greater. This arrangement of the dimensions d2, d3, and d4 makes it possible to cause a downward flow of the lubricating oil 59 in the fourth gap 54 while at the same time reducing the loss in torque caused by friction in the second and third gaps 52b and 52c.

Furthermore, the radial dimension d4 of the fourth gap 54 is preferably greater than the radial dimension d5 of the gap 51 between the outer circumferential surface of the stationary shaft 32 and the first inner circumferential surface 41a of the hub 41.

Furthermore, the radial dimension d2 of the second gap 52b is preferably smaller than the axial dimension d3 of the third gap 52c during the rotation of the hub 41 relative to the stationary shaft 32. A change in conditions such as a temperature during the rotation causes a greater change in the axial dimension d3 of the third gap 52c than in the radial dimension d2 of the second gap 52b. An increase in the axial dimension d3 of the third gap 52c contributes to reducing an influence of the change in the dimension d3 on rotational accuracy or the torque.

A tapered seal portion 54a whose radial dimension gradually increases in an upward direction is arranged in the fourth gap 54 at a level higher than that of the pumping groove array 541. The upper surface of the lubricating oil 59 is located within the tapered seal portion 54a. Accordingly, the upper surface of the lubricating oil 59 is attracted downward by surface tension to provide improved prevention of the leakage of the lubricating oil 59 through the fourth gap 54.

The vertical section of the first cup portion 33 according to the present preferred embodiment substantially assumes the shape of the letter "L" with the circular plate portion 331 and the cylindrical portion 332. Because of the provision of the annular recessed portion above the second upper surface 41d of the hub 41, the first and second inner circumferential surfaces 41a and 41e of the hub 41 partially overlap with each other with respect to the axial direction, so that both the first and second inner circumferential surfaces 41a and 41e of the hub 41 can have a sufficient axial dimension. This makes it possible to limit the axial dimension of the fluid dynamic bearing apparatus 5 as a whole while enabling both the upper and lower radial dynamic pressure groove arrays 511 and 512 and the pumping groove array 541 to be arranged axially in a sufficiently wide range.

Figure 8:
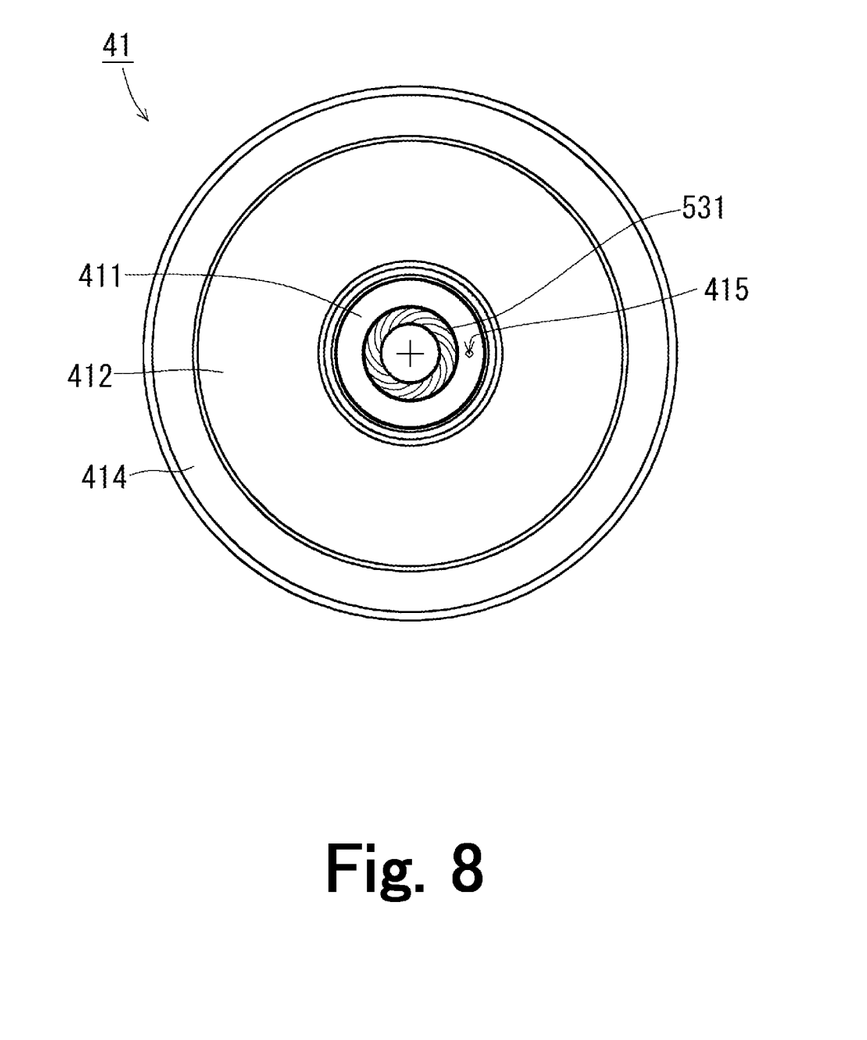
FIG. 8 is a bottom view of the hub.

FIG. 8 is a bottom view of the hub 41. As illustrated in FIG. 8, the lower surface of the sleeve portion 411 of the hub 41 has a lower thrust dynamic pressure groove array 531 arranged thereon to generate a fluid dynamic pressure in the lubricating oil 59 in the gap 53.

The lower thrust dynamic pressure groove array 531 is an array of a plurality of dynamic pressure generating grooves in a spiral pattern centered on the center axis 9 which are arranged in the circumferential direction. During the rotation of the hub 41 relative to the stationary shaft 32, a pressure is applied to the lubricating oil 59 by the lower thrust dynamic pressure groove array 531. The hub 41 is arranged to rotate while being axially supported in relation to the second cup portion 34 by the fluid dynamic pressure generated in the lubricating oil 59.

Note that it is enough that the lower thrust dynamic pressure groove array 531 is arranged on at least one of the lower surface of the sleeve portion 411 and the upper surface of the circular plate portion 341 of the second cup portion 34.

Returning to FIG. 4, the inner circumferential surface of the cylindrical portion 342 of the second cup portion 34 and the outer circumferential surface of the sleeve portion 411 of the hub 41 are arranged opposite to each other with a gap 55 defined therebetween. The lower surface of the lubricating oil 59 is located within the gap 55. The gap 55 defines a tapered seal portion whose radial dimension gradually decreases in a downward direction. Accordingly, the lower surface of the lubricating oil 59 is attracted downward by surface tension, which contributes to preventing a leakage of the lubricating oil 59 through the gap 55.

An upper end opening of the through hole 415 is arranged on the second upper surface 41d of the hub 41. In other words, an upper end of the through hole 415 opens into the third gap 52c defined between the second upper surface 41d of the hub 41 and the lower end portion of the cylindrical portion 332 of the first cup portion 33. The through hole 415 extends downward away from the third gap 52c. On the other hand, a lower end opening of the through hole 415 is arranged on the lower surface of the sleeve portion 411 of the hub 41.

When causing the lubricating oil 59 to produce an axial supporting force, each of the upper and lower thrust dynamic pressure groove arrays 521 and 531 causes the lubricating oil 59 to flow radially inward. Meanwhile, as described above, an upward flow of the lubricating oil 59 is caused in the gap 51. Accordingly, both a radially inward flow of the lubricating oil 59 and a radially outward flow of the lubricating oil 59 are caused in the gap 52. A portion of the lubricating oil 59 flowing radially outward in the gap 52 enters into the through hole 415 to cause a downward flow of the lubricating oil 59 in the through hole 415.

As described above, the lubricating oil 59 is arranged to circulate through the following gaps by flowing therein in the following order: the gap 51, a portion of the gap 52 radially inward of the through hole 415, the through hole 415, a portion of the gap 53 radially inward of the through hole 415, and the gap 51.

The pumping groove array 541 may introduce air bubbles into the lubricating oil 59 in the fourth gap 54 when causing the lubricating oil 59 to flow downward therein. In the present preferred embodiment, the through hole 415 is arranged to enable an excellent discharge of such air bubbles. Specifically, in the present preferred embodiment, the annular recessed portion is arranged above the second upper surface 41*d* of the hub 41 to accommodate the lower end portion of the cylindrical portion 332 of the first cup portion 33. In addition, the upper end of the through hole 415 is arranged to open into the annular recessed portion, and the lubricating oil 59 is caused to flow downward in the through hole 415. Accordingly, any air bubbles introduced into the lubricating oil 59 are efficiently caused to enter into the through hole 415 through the fourth gap 54 and the third gap 52*c*. Thereafter, the air bubbles are carried to the gap 55 through the through hole 415 and the gap 53, and discharged out of the fluid dynamic bearing apparatus 5 through the lower surface of the lubricating oil 59.

According to the present preferred embodiment, air bubbles are substantially prevented from intruding into a region facing any of the dynamic pressure groove arrays 511, 512, 521, and 531 where they would cause deterioration of the performance of the dynamic pressure groove array 511, 512, 521, or 531.

Moreover, referring to FIG. 6, the radial dimension d6 of the through hole 415 is preferably greater than both the radial dimension d2 of the second gap 52*b* and the axial dimension d3 of the third gap 52*c* during the rotation of the hub 41 relative to the stationary shaft 32, so that any air bubbles introduced into the lubricating oil 59 can be more efficiently caused to enter into the through hole 415.

Other features, elements, steps, characteristics and advantages of the present invention will become more apparent from the following detailed description of preferred embodiments of the present invention with reference to the attached drawings.

For example, the lower end portion of the cylindrical portion of the first cup portion is preferably flat in the above-described preferred embodiment, but may be curved in other preferred embodiments. Also, the annular recessed portion of the rotating portion includes a flat surface, i.e., the second upper surface 41*d*, in the above-described preferred embodiment. Note, however, that the annular recessed portion may be defined by only sloping or curved surfaces in other preferred embodiments. Various modifications may be made to the annular recessed portion insofar as the annular recessed portion is arranged to accommodate at least the lower end portion of the cylindrical portion of the first cup portion, while at the same time one end of the through hole is arranged to open into the annular recessed portion.

Also, the through hole extends along the center axis in the above-described preferred embodiment. Note, however, that the through hole may be arranged to extend at an angle to the center axis in other preferred embodiments. As to the lower end opening of the through hole, it is enough that the lower end opening of the through hole is arranged to open into the gap between the stationary and rotating portions at a level lower than that of the annular recessed portion. For example, the lower end opening of the through hole may be in direct communication with the gap between the outer circumferential surface of the stationary shaft and the inner circumferential surface of the rotating portion, in other preferred embodiments.

Note that, in other preferred embodiments, the lower surface of the lubricating oil may not necessarily be located in the same place as in the above-described preferred embodiment insofar as it is located between the stationary and rotating portions at a level lower than that of the annular recessed portion.

Note that the present invention is also applicable to spindle motors arranged to rotate other types of disks than magnetic disks, such as an optical disk or the like. Note, however, that an application of the present invention to a spindle motor designed for a magnetic disk(s) has great technological significance, because the spindle motor designed for the magnetic disk(s) requires a particularly excellent rotation performance of the bearing apparatus.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. A bearing apparatus comprising:
a stationary portion including a stationary shaft arranged along a center axis extending in a vertical direction, and a first cup portion including a first circular plate portion extending radially outward from the stationary shaft;
a rotating portion arranged to rotate about the stationary shaft; and
a lubricating oil; wherein
the first cup portion further includes a first cylindrical portion projecting downward from an outer edge portion of the first circular plate portion;
the rotating portion includes:
  a first upper surface arranged opposite to a lower surface of the first circular plate portion;
  an annular recessed portion arranged to accommodate at least a lower end portion of the first cylindrical portion;
  a first inner circumferential surface arranged opposite to an outer circumferential surface of the stationary shaft; and
  a second inner circumferential surface arranged opposite to an outer circumferential surface of the first cup portion;
the lubricating oil is arranged in a gap between the stationary and rotating portions;
at least one of the outer circumferential surface of the stationary shaft and the first inner circumferential surface of the rotating portion includes a radial dynamic pressure groove array;
the stationary portion includes a second cup portion including a second circular plate portion arranged to extend radially outward from the outer circumferential surface of the stationary shaft below the first cup portion and a second cylindrical portion arranged to project upward from an outer edge portion of the second circular plate portion; and
at least one of a lower surface of the rotating portion and an upper surface of the second cup portion includes a lower thrust dynamic pressure groove array arranged to generate a fluid dynamic pressure in the lubricating oil during rotation of the rotating portion;
a lower surface of the lubricating oil is located between the second cup portion and the rotating portion at a level lower than a level of the annular recessed portion;
one of the first and second cup portions is integral with the stationary shaft so as to define a single monolithic member, and the other of the first and second cup portions is fixed to the stationary shaft;

the first inner circumferential surface of the rotating portion and the outer circumferential surface of the stationary shaft are arranged to together define a first gap therebetween;

the second inner circumferential surface of the rotating portion and the outer circumferential surface of the first cup portion are arranged to together define a second gap therebetween; and the first gap has a radial dimension smaller than that of the second gap.

2. The bearing apparatus according to claim 1, wherein the first and second inner circumferential surfaces are arranged to partially overlap with each other with respect to an axial direction.

3. The bearing apparatus according to claim 1, wherein the rotating portion includes a first cylindrical surface arranged radially opposite to an inner circumferential surface of the cylindrical portion; and each of the first inner circumferential surface and an upper portion of the rotating portion which includes the first cylindrical surface is arranged to overlap with the first cylindrical portion of the first cup portion in a radial direction.

4. The bearing apparatus according to claim 3, wherein the first cylindrical surface and the inner circumferential surface of the first cylindrical portion are arranged to together define a third gap therebetween; and the first gap has a radial dimension smaller than that of the third gap.

5. The bearing apparatus according to claim 1, wherein one of the lower surface of the first circular plate portion and the first upper surface of the rotating portion includes a thrust dynamic pressure groove array arranged thereon to generate a fluid dynamic pressure in the lubricating oil during the rotation of the rotating portion.

6. The bearing apparatus according to claim 5, wherein the first upper surface of the rotating portion and the lower surface of the first circular plate portion are arranged to together define a third gap therebetween, and the annular recessed portion and the lower end portion of the first cylindrical portion are arranged to together define a fourth gap therebetween, each of the third and fourth gaps being defined between the first cup portion and the rotating portion; and the third gap has an axial dimension smaller than an axial dimension of the fourth gap.

7. The bearing apparatus according to claim 1, wherein the rotating portion further includes a through hole filled with the lubricating oil, a first end of the through hole opening into the annular recessed portion, and a second end that is opposite to the first end of the through hole and opens into the gap between the stationary and rotating portions at a level lower than a level of the annular recessed portion.

8. The bearing apparatus according to claim 7, wherein one of the first cup portion and the rotating portion includes a pumping groove array arranged to cause the lubricating oil to flow toward an end of the through hole during the rotation of the rotating portion.

9. The bearing apparatus according to claim 1, further comprising a tapered seal portion in the outer circumferential surface of the first cup portion and the second inner circumferential surface of the rotating portion, the tapered seal portion having a radial dimension that gradually increases in an upward direction.

10. A spindle motor comprising:

the bearing apparatus of claim 1;

a stationary portion including the stationary shaft and the first cup portion;

a rotating portion supported through the bearing apparatus so as to be rotatable with respect to the stationary portion of the spindle motor, the rotating portion of the spindle motor including the rotating portion of the bearing apparatus and a support portion arranged to support a disk; and a stator and a magnet arranged to produce a torque centered on the center axis between the stationary and rotating portions of the spindle motor.

11. A spindle motor comprising:

the bearing apparatus of claim 10;

the stator is arranged radially outward from the first cylindrical portion;

the stator is arranged radially inward from the magnet; and a maximum axial thickness of the first cylindrical portion is greater than a minimum axial thickness of all portions of the rotating portion directly axially opposed to the stator.

12. A disk drive apparatus comprising:

the spindle motor of claim 10;

an access portion arranged to read and/or write information from or to the disk supported by the rotating portion of the spindle motor; and a housing arranged to contain the spindle motor and the access portion.

13. The bearing apparatus according to claim 1, wherein one of the first cup portion and the rotating portion includes a pumping groove array configured to cause the lubricating oil to flow downward toward the lower end portion of the first cylindrical portion during the rotation of the rotating portion.

14. A spindle motor comprising:

the bearing apparatus of claim 1;

a stationary portion including the stationary shaft and the first cup portion;

a rotating portion supported through the bearing apparatus so as to be rotatable with respect to the stationary portion of the spindle motor, the rotating portion of the spindle motor including the rotating portion of the bearing apparatus and a support portion arranged to support a disk; and a stator and a magnet arranged to produce a torque centered on the center axis between the stationary and rotating portions of the spindle motor; wherein the stator is arranged radially outward from the first cylindrical portion;

the stator is arranged radially inward from the magnet; and the first cup portion and all portions of the rotating portion directly axially opposed to the stator are arranged to partially overlap with each other with respect to a radial direction.

* * * * *